United States Patent Office 3,491,078
Patented Jan. 20, 1970

3,491,078
PROCESS FOR POLYMERIZING ISOPRENE WITH A FREE INORGANIC COBALT SALT-ALKOXY ALUMINIUM CATALYST
François Dawans, Bougival, France, assignor to Institut Francais du Petrole des Carburants et Lubrifiants, Rueil-Malmaison, France
No Drawing. Filed Dec. 18, 1967, Ser. No. 691,154
Claims priority, application France, Dec. 30, 1966, 89,729
Int. Cl. C08d 1/14
U.S. Cl. 260—94.3     10 Claims

ABSTRACT OF THE DISCLOSURE

The present disclosure is directed to a process for polymerizing isoprene with a free inorganic cobalt salt-alkoxy aluminum catalyst to produce polyisoprene having a structure consisting essentially of cis-1,4 units and 3,4 units in substantially equal amounts.

---

This invention relates to polymerizing isoprene by means of a new catalyst.

The thus obtained polyisoprene exhibits a structure essentially consisting (i.e., for at least 90%) of cis-1,4 and 3,4 units in substantially equal amounts, with a regular chain is responsible of original properties.

By this definition is meant a polyisoprene containing 40 to 60% of cis-1,4 units, 40 to 60% of 3,4 units and 0 to 10% as total of 1,2 and trans 1,4 units. In a preferred embodiment, said polyisoprene contains 45 to 55% of cis-1,4 units, 45 to 55% of 3,4 units and a total of 0 to 5% of 1,2 and trans 1,4 units.

Further this isoprene exhibits a regular chain, resulting into both a substantial crystallinity which can be detected by differential thermal analysis and a positive absorption in infra-red at about 1140 cm.$^{-1}$ and no-absorption at about 1127 cm.$^{-1}$ which denotes the absence of long sequences of cis-1,4 units in the polymer.

Polyisoprenes of the same type as according to this invention have been described in French patent application No. 36,006, filed Oct. 22, 1965, and No. 50,669, filed Feb. 22, 1966.

According to the process of this invention, isoprene is contacted with a catalyst comprising at least (A) a free inorganic salt, i.e., not engaged in a complex, of cobalt, and (B) an organoaluminum compound of the formula $AlR_1R_2(OR_3)$ where $R_1$ and $R_3$ are monovalent hydrocarbon groups and $R_2$ is a hydrogen atom, a monovalent hydrocarbon group or a monovalent hydrocarbyloxy group selected in the same group as $(OR_3)$.

The polymers of this invention may be advantageously employed for some specific uses of synthetic rubbers, for example as amortization rubbers.

This invention is concerned with the manufacture of polyisoprene of binary composition, with a high polymerization speed, a good reproduction and an easy control of the molecular weight.

The component (A) of the initiating system of this invention is a free inorganic salt of cobalt. As examples of such salts the halogenides (chloride, bromide, fluoride and iodide), the nitrate, the sulfate and the silicofluoride may be mentioned.

In a preferred embodiment, the cobalt salts are used in the pure state, free of crystallization water, as obtained by heating under vacuum.

The cobalt bromide and iodide are preferred since their effect ist particularly specific.

The organic compounds of aluminum (components B of the catalyst) conform to the formula $AlR_1R_2(OR_3)$ where $R_1$ and $R_3$ are preferably alkyl, cycloalkyl, alkenyl, cycloalkenyl, aryl, arylalkyl of alkylaryl radicals and $R_2$ is preferably a hydrogen atom, a radical selected in the same group as the $R_1$ and $R_3$ radicals, or a radical selected in the group of the $OR_3$ radicals.

$R_1$, $R_2$ and $R_3$ preferably contain from 1 to 30 carbon atoms, more advantageously 1 to 10.

Amongst the hydrocarbyloxy derivatives of aluminum, which may be used as components B, the following are to be named:

Monoethyl - monohydro-monoethoxy aluminum, monoethyl - monohydro-monooctoxy aluminum, monoisobutyl-monohydro - monostearyloxy aluminum, diethylmonoethoxy aluminum, diethylmonomethoxy aluminum, diethyl-monoisopropoxy aluminum, diethylmonoisobutoxy aluminum, diethylmono - n-butoxy aluminum, diethylmonopentoxy aluminum, diethylmonohexoxy aluminum, diethylmonoheptoxy aluminum, diethylmonooctoxy aluminum, diethylmonodecanoxy aluminum, diethylmonododecyloxy aluminum, diethylmonostearyloxy aluminum, monoethyldimethoxy aluminum, monoethyldiethoxy aluminum, monoethyl-dipropoxy aluminum, monoethyl diisobutoxy aluminum, monoethyl di-n-butoxy aluminum, monoethyl dihexyloxy aluminum, monoethyl diheptyloxy aluminum, monoethyl dioctyloxy aluminum, monoethyl dinonyloxy aluminum, monoethyl didecyloxy aluminum, monoethyl dicetyloxy aluminum, monoethyldistearyloxy aluminum, dimethyl monoethoxy aluminum, diisopropyl monoethoxy aluminum, di-n-butyl monoethyl aluminum, diisobutylmonoethoxy aluminum, diisobutyl monoisobutoxy aluminum, diphenyl monoethoxy aluminum, monophenyl diethoxy aluminum, diocrotyl monoethoxy aluminum, dioctyl monoethoxy aluminum, dioctyl monoisobutoxy aluminum and the like.

These aluminum compounds of the hydrocarbyloxy kind do not take fire normally in the air and their reaction with water is also very weak as compared with that of other organometallic compounds. This means that component (B) of the catalyst may be stored without risk for a long time while retaining its stability. It is an important advantage of this invention.

The catalyst of this invention may be prepared by admixing two components (A) and (B), preferably at a temperature in the range of about −80° C. to about +80° C. The reaction is advantageously carried out in a solvent, for example a hydrocarbon.

Some of the thus prepared catalysts are soluble in a hydrocarbon solvent, which is also an important advantage of this invention since it allows to lower the proportion of catalyst to be used and to obtain polymers of high molecular weights which are free of gel, with a good reproduction. It allows also an easy elimination of the catalytic residues when the polymerization has come to an end, thus avoiding an alteration, particularly with respect to the colour of the product.

The components (A) and (B) can be admixed with the monomer in any order. The molar ratio of the component (B) to the component A is usually between 0.25/1 and 20/1, preferably between 1/1 and 5/1, this being in no way limitative values.

The concentration of the catalyst of this invention may vary broadly. The proportion of the cobalt derivative is usually between 0.01 and 1 milli-g. atom of cobalt per each gram of diolefin to be polymerised. If rubbery polymers are to be manufactured, the amount must be usually lower than 0.5 milli-g. atom. This amount is preferably determined with respect to the desired molecular weight of the product.

The medium wherein the catalyst is formed by combination of one or several alkoxyaluminum compounds with salts of cobalt, and the medium wherein the polymerization is carried out thereafter preferably consist of aromatic or saturated aliphatic or cycloaliphatic hydrocarbons which are liquid at the ambient temperature. Particularly preferred solvents are aromatic hydrocarbons such as benzene, toluene, xylene, and the like; aliphatic hydrocarbons such as pentane, hexane, heptane, octane, nonane, decane, and the like; and cycloaliphatic hydrocarbons such as cyclohexane, cycloheptane and the like. A mixture of at least two of these solvents may be used. For example petroleum ether or the like is a quite advantageous polymerization solvent.

The polymerization process of this invention may be carried out at temperatures varying broadly, for example between —40° C. and 100° C. A temperature between 0 and 60° C. is usually preferred, although higher and lower temperatures may also be used.

The catalytic species may also be formed in homogeneous solution by contacting, at a low temperature before the polymerization, the components of the catalytic system, optionally in the presence of a minor amount of the monomer, for example 1 to 5 moles of isoprene per g. atom of cobalt.

The catalyst used in this invention is stable under inert atmosphere and does not deteriorate when stored, contrary to conventional organometallic compounds. Consequently, starting with a preformed catalytic solution, it is quite easy to obtain a good reproduction of the polymerization rate and the molecular weight. This is another advantage of this invention.

The polymerization reaction may be carried out under the self pressure or under any appropriate pressure which is sufficient to maintain the reaction mixture substantially in liquid phase.

The process may be carried out in batch or in continuous manner.

It must be understood that it is within the scope of this invention to preform the initiating species by admixture of its constituents in a distinct vessel; the resulting mixture or the isolated catalytic species may be introduced thereafter into the vessel containing the monomer and the diluent, or alternately the monomer is introduced after the initiator.

In a continuous process, the above concentrations of the reactants in the reaction vessel may be maintained for an appropriate residence time. The residence time in a continuous process may of course vary broadly, according to factors such as the temperature, the pressure, the ratio of the catalytic constituents and the concentration of the catalyst.

In a continuous process the residence time is usually between 1 second and 10 hours or more when the conditions are in the above-referred ranges.

In a process by separate charges, the reaction time is usually between 1 and 12 hours but may be as high as 100 hours or more.

At the end of the polymerization, when a batch process has been used, the total reaction mixture is treated to inactivate the initiator and recover the polyisoprene.

Any known process may be used for this treatment of the reaction mixture.

In one of these processes, the polymer is recovered by carrying away the diluent with steam. In another appropriate process, there is added to the mixture a substance which inactivates the catalyst, such as an alcohol and water, and which causes the polymer to precipitate. The polymer is thereafter separated from the alcohol and the diluent by any appropriate process such as a decantation or a filtration. It is often preferred to add initially just the amount of inactivating substance which suffices to inactivate the catalyst without causing the polymer to precipitate. It has also been observed that it is advantageous to add an antioxidant such as β-phenylnaphthylamine or para tert. butyl cresol to the solution of the polymer, before recovering the polymer. After the inactivating substance and the antioxidant have been added, the polymer may be separated from the solution by use of an excess of a substance such as ethanol or isopropanol. It is also advantageous to add the alcohol, during the precipitation of the polymer, a complexing agent for the metals of the catalytic system, for example acetylacetone, which allows the easy obtainment of a polymer which is free of metallic residues.

It must be understood that it is also possible to use other appropriate means to recover the polymer from its solution. After the polymer has been separated from the alcohol and the diluent by means of filtration or other appropriate operations, the polymer is dried.

The polyisoprenes of this invention may be liquids or rubbery solids. These polymers may be admixed with various ingredients, using the processes which have allowed in the prior art to admix natural or synthetic rubbers with other ingredients. The polyisoprenes of this invention may be admixed with accelerators of vulcanization, vulcanization agents, reinforcing agents and charges, of the same kind as those used with natural rubbers. It is also possible according to this invention, to admix the polymers with other polymerised substances such as natural rubber, cis-1,4 polybutadiene, polyethylene and the like.

A physical study has shown that the original properties of the polymer were derived from the substantially regular alternation of cis-1,4 units with vinyl-3,4 units and from the narrow repartition of the molecular weights (Mn/MW usually 1.15). As it will be seen from the following examples, the ratio between the numbers of units of these two structures remains substantially constant and practically equal to 1.

The microstructure of the polyisoprenes has been determined by infra-red spectrophotometry, according to the method of Ciampelli, Morero and Cambini (Makromol. Chem. 61, 250, 1963), and by nuclear magnetic resonance, according to the method of Hung Yu Chen (Anal. Chem. 34, 1134 and 1793, 1962); further the particular type of bonding of the cis-1,4 and 3,4 units in the polyisoprenes of this invention results from the absence of cis-1,4 sequences and the presence of a substantial crystallinity.

The infrared absorption which is linked to the skeletal vibration may be observed at 1140 cm.$^{-1}$ which is close to the frequency observed by Golub (J. Polymer Science, 36, 523, 1959) on a polyisoprene with a cis-trans statistical repartition, whereas no absorption may be observed at 1127 cm.$^{-1}$ which frequency is characteristics of long sequences of cis-1,4 units. Thus long sequences of cis-1,4 units are absent in the polymers of this invention.

However the repartition of these cis-1,4 and 3,4 units in the chains of the polyisoprenes of this invention is in no way statistical; the existence of a regular chain is shown by the presence of a substantial crystallinity in these polymers. For example, by differential thermal analysis, an endothermic peak may be observed, which corresponds to a crystalline melting point (a preferred method of differential thermal analysis has been described by W. Cooper in Journal of Polymer Science, A1, volume 1, page 159, 1963).

The intrinsic viscosities [η] have been determined at 30° C. on toluenic solutions.

This invention may be further illustrated by means of the nonlimitative examples which follow.

EXAMPLE 1

To a suspension of 1.96 g. of $CoI_2$ in 200 cc. of toluene, there is added, under inert atmosphere, 34 g. of isoprene and 5 cc. of a solution containing 4.24 moles of $(C_2H_5)_2$ $AlOC_2H_5$ per liter of toluene. The reaction mixture is maintained at —20° C. for 24 hours and thereafter stirred for 7 hours at 55° C. In this way 25 g. of polyisoprene is obtained whose microstructure is composed of 51% of 3,4 units and 45% of cis-1,4 units, the remaining units being essentially trans-1,4 units. The intrinsic viscosity as determined at 30° C. in toluene is 1.48.

If, instead of cobalt iodide, an equimolecular amount of cobalt acetylacetonate or of complex ($CoCl_2$, pyridine)

is used, all other conditions remaining unchanged, no polymer is formed.

EXAMPLES 2 TO 6

In these examples, the polymerizations are carried out with modified proportions of cobalt iodide and reaction temperatures. A reaction time of 7 hours, a concentration of monomer of 2.3 moles per liter and a molar ratio Al/Co of 3.4 are maintained constant during these experiences whose results are given in Table I.

TABLE I

| Ex. | Percent molar Co/$C_5H_8$ | Polymerization temperature, °C. | Yield, percent | Microstructure, percent cis-1,4 | [1] Percent 3,4 | $[\eta]$ |
|---|---|---|---|---|---|---|
| 2 | 2.50 | 55 | 94 | 44.5 | 55.5 | 0.365 |
| 3 | 1.25 | 55 | 90 | 44.5 | 55.5 | 1.120 |
| 4 | 0.62 | 55 | 85 | 44 | 56 | 1.470 |
| 5 | 0.62 | 40 | 84 | 44.5 | 55.5 | 2.540 |
| 6 | 0.62 | 20 | 80 | 46 | 54 | 1.470 |

[1] The percentages of trans-1,4 and vinyl-1,2 units are lower than 2%, with respect to the total unsaturation.

EXAMPLE 7

If, in Example 2, an equimolar proportion of cobalt bromide $CoBr_2$ is substituted for cobalt iodide, all other conditions remaining unchanged, the yield attains 40%; the microstructure of the polymer consists of 48.5% of cis-1,4 units and 48.5% of 3,4 units, the remaining unsaturation being essentially of the trans 1,4 type. The intrinsic viscosity is 2.9.

EXAMPLE 8

If, in Example 2, an equimolar proportion of cobalt difluoride or cobalt dichloride is substituted for cobalt iodide, all other conditions remaining unchanged, the yield is only 5% and the microstructure corresponds to 44% cis-1,4 units and 56% 3,4 units.

EXAMPLE 9

To a suspension of 3.9 g. of cobalt diiodide in 400 cc. of toluene, there is added under inert atmosphere 7 g. of isoprene and 10 cc. of a solution containing 4.24 moles of $(C_2H_5)_2AlOC_2H_5$ per liter of toluene; the reaction mixture is stirred for 1 hour at room temperature and then filtrated under inert atmosphere. 200 cc. of the clear and uncolored filtrated solution are added to a solution of 61 g. of isoprene in 200 cc. of toluene. After stirring at 40° C. for 7 hours, the reaction mixture has remained perfectly homogeneous and clear. 28 g. of polyisoprene are thus obtained, the intrinsic viscosity of which is 3.5. The microstructure is composed of 48% cis-1,4 units and 52% 3,4 units.

I claim:

1. A process for stereospecifically polymerizing isoprene to polyisoprene having a structure consisting essentially of cis-1,4 units and 3,4 units in substantially equal amounts, with a regular chain, which comprises contacting isoprene under polymerization conditions with a catalyst consisting essentially of (a) a free inorganic salt of cobalt and (b) an aluminum compound of the formula $AlR_1R_2(OR_3)$, wherein $R_1$ and $R_3$ are monovalent hydrocarbon radicals and $R_2$ is a hydrogen atom, a monovalent hydrocarbon radical or a radical selected from the group consisting of the $OR_3$ radicals.

2. The process according to claim 1, wherein the cobalt salt is cobalt dibromide or cobalt diiodide.

3. The process according to claim 1, wherein the aluminum compound is diethylmonoethoxyaluminum.

4. The process according to claim 1, wherein the molar ratio of the component (b) to the component (a) is between 0.25/1 and 20/1.

5. The process according to claim 1, wherein the molar ratio of the component (b) to the component (a) is between 0.25/1 and 5/1.

6. The process according to claim 1, wherein there is used from 0.01 to 1 milli-g. atom of cobalt, as free inorganic salt, per 1 g. of isoprene.

7. The process of claim 1, wherein $R_1$ and $R_3$ are selected from the group consisting of alkyl, cycloalkyl, alkenyl, cycloalkenyl, aryl, arylalkyl or alkylaryl radicals.

8. The process of claim 1, wherein $R_1$, $R_2$ and $R_3$ contain about 1 to 10 carbon atoms.

9. The process of claim 1, wherein polymerization is conducted at a temperature of about 0 to 60° C.

10. The process of claim 2, wherein the aluminum compound is $(C_2H_5)_2AlOC_2H_5$.

References Cited

UNITED STATES PATENTS 3,135,725 6/1964 Carlson et al. _____ 260—94.3
3,357,967 12/1967 Wesslau _____ 260—94.6

JOSEPH L. SCHOFER, Primary Examiner

R. A. GAITHER, Assistant Examiner